United States Patent [19]
Takeuchi et al.

[11] Patent Number: 4,930,992
[45] Date of Patent: Jun. 5, 1990

[54] CONTROL APPARATUS OF VARIABLE DELIVERY PUMP

[75] Inventors: Kunihiko Takeuchi, Kawasaki; Yoshisuke Akita, Hasuda; Osamu Hayakawa, Fuchu, all of Japan

[73] Assignee: Tokyo Keiki Company Ltd., Tokyo, Japan

[21] Appl. No.: 408,218

[22] Filed: Sep. 18, 1989

Related U.S. Application Data

[62] Division of Ser. No. 216,417, Jul. 7, 1988, Pat. No. 4,886,422.

[51] Int. Cl.$^5$ .............................................. F04B 49/00
[52] U.S. Cl. ..................................... 417/20; 417/218; 60/452; 60/329
[58] Field of Search .................... 417/20, 43, 218, 219, 417/220, 221, 222, 223, 300; 60/452, 329

[56] References Cited

U.S. PATENT DOCUMENTS 4,507,057 3/1985 Igarashi et al. ...................... 417/216
4,587,808 5/1986 Watanabe et al. ...................... 60/390
4,801,247 1/1989 Hashimoto et al. ................ 417/213

Primary Examiner—Leonard E. Smith
Assistant Examiner—D. Scheuermann
Attorney, Agent, or Firm—Wenderoth, Lind & Ponack

[57] ABSTRACT

A control load such as a cylinder or the like is driven at a constant speed by controlling the flow rate of a variable delivery pump. The control mode is switched to the pressure control to keep the stop pressure constant on the basis of an increase in pressure when the control load stops. A remaining delivery amount which will be necessary to raise the delivery pressure to an object stop pressure when the load stops and an excess delivery volume due to the operation time lag when it is assumed that the delivery by the pump is stopped at the present time are predicted. When they coincide, the delivery amount of the pump is set to zero and the control mode is switched to the pressure control. On the other hand, the product of a load volume and a fluid compressibility is calculated from the increase in pressure when the load stops. The feedback gain of the pressure control is controlled on the basis of the calculated value of this product. Further, the pressure difference and the designated flow rate are compared and either smaller one of them is always set to the designated value of the flow control.

3 Claims, 14 Drawing Sheets

CONTROL APPARATUS OF VARIABLE DELIVERY PUMP

This is a divisional application of Ser. No. 07/216,417, filed July 7, 1988, now U.S. Pat. No. 4,886,422 on 12/12/89.

BACKGROUND OF THE INVENTION

The present invention relates to a control apparatus of a variable delivery pump for driving an actuator by controlling a delivery flow rate and a delivery pressure of the variable delivery pump and, more particularly, to a control apparatus of a variable delivery pump in which when the actuator which is moving at a constant velocity by the control of the delivery flow rate stops, the control mode is switched to the delivery pressure control mode, thereby keeping the stop pressure constant.

As a conventional control apparatus of a variable delivery pump, for example, there is known an apparatus as shown in FIG. 1.

In FIG. 1, reference numeral 10 denotes a variable delivery pump in which an angle of a slant plate (swash plate) by changing, e.g., an input voltage or input current, so that a piston stroke changes and a delivery amount can be changed.

Reference numeral 12 denotes a servo amplifier to control a flow rate; 14 indicates a servo amplifier to control a pressure; 16 a switch to change over outputs of the servo amplifiers 12 and 14; 18 a voltage comparator to control the switching operation of the switch 16; and 20 a cylinder as a control load.

In such a control apparatus, the switch 16 is set to the A size in the ordinary flow rate control mode. An angle sensor 28 to detect an angle of inclination of the slant plate is attached to the pump 10. A detection angle $\theta$ of the angle sensor 28 represents a pump delivery flow rate Q. The detection angle $\theta$ of the angle sensor 28, namely, the delivery flow rate Q is input to an adding point 22. A designated flow rate value $Q_c$ is also input to the adding point 22 from a flow rate setting device (not shown). Therefore, the difference between the designated flow rate value $Q_c$ and the pump delivery flow rate Q is obtained by the adding point 22 and input to the servo amplifier 12. Thus, the pump 10 is controlled in a feedback manner by an output of the servo amplifier 12 so as to keep the pump delivery flow rate Q to the designated flow rate value $Q_c$. A piston rod 32 of the cylinder 20 is moved at a constant velocity.

When the piston rod 32 collides with an object 100 by the actuation of the cylinder 20 due to such a flow rate control and mechanically stops, the pressure in the cylinder suddenly starts increasing.

A difference value $(P_c - \alpha)$ which is derived by subtracting a predetermined value $\alpha$ from a designated pressure value $P_c$ which is output from a pressure setting device (not shown) is input as a reference value to the voltage comparator 18. A pump delivery pressure P detected by a pressure sensor 30 is also input to the voltage comparator 18. Therefore, when the pump delivery pressure P which has started increasing by the collision of the piston rod 32 with the object 100 reaches the reference value $(P_c - \alpha)$ which is slightly smaller than the designated pressure value $P_c$, an output of the voltage comparator 18 is inverted, so that the switch 16 is switched to the B side. By the connection of the switch 16 to the B side, the difference $(P_c - P)$ from an adding point 26 is input to the servo amplifier 14. There is performed a pressure control to control a delivery amount of the variable delivery pump 10 so as to keep the pump delivery pressure, i.e., the stop pressure P to the designated pressure value $P_c$ by the output of the servo amplifier 14.

However, such a conventional control apparatus of the variable delivery pump has the following problems.

Since the switching from the flow rate control to the pressure control is performed when the delivery pressure P reaches the reference value $(P_c - \alpha)$ which is slightly smaller than the designated pressure value $P_c$, for example, as shown in FIG. 2, when the designated flow rate value $Q_c$ is set to a large value or when it reaches the stroke end, if the cylinder volume is small, even if the control mode is switch from the flow rate control to the pressure control, the fluid of the amount larger than it is needed is discharged due to the response time lag of the pump. Thus, an extremely large overshoot $\Delta P$ is generated for the designated pressure value $P_c$.

To prevent this, if the gain of the servo amplifier 14 is set to a very low value in order to reduce the overshoot $\Delta P$, the settling time until the stop pressure is settled to the designated pressure value $P_c$ becomes long, causing a problem of deterioration in control accuracy.

On the other hand, when the piston rod 32 collides with the object 100 and the cylinder 20 stops, the control mode is switched to the pressure control. However, in the pressure control, the product $(V\beta)$ of a content volume V of the pipes of the cylinder 20 and a compressibility $\beta$ of the operating fluid exerts a large influence on the pressure control.

Therefore, in the conventional control apparatus, in the state in which the control apparatus is assembled to the variable delivery pump 10, the gain of the servo amplifier 14 is adjusted so as to obtain the optimum control characteristics while observing the detection waveform of the pressure sensor 30 upon switching to the pressure control.

However, the adjusting work to obtain the optimum pressure characteristic is extremely complicated.

Further, in order to eliminate the overshoot when switching to the pressure control as shown in FIG. 2, it is necessary to adjust a predetermined value $\alpha$ for deciding a reference voltage of the voltage comparator 18 to the optimum value.

For example, when the predetermined value $\alpha$ is set to a large value to eliminate the overshoot, if the delivery pressure fluctuates due to the disturbances of the resistance and the like of the fluid passing through the pipes at the time of the flow rate control, there is caused a malfunction such that the pump delivery pressure P exceeds the reference value $(P_c - \alpha)$ and the control mode is switched to the pressure control. The occurrence of the malfunction such as to switch to the pressure control during the flow rate control raises the pump delivery pressure to the designated pressure value $P_c$, so that the delivery flow rate suddenly increases. There is a fear such that the piston rod 32 of the cylinder 20 moves at an abnormal high speed.

On the contrary, when the predetermined value $\alpha$ is set to a small value, after the pump delivery pressure P was settled to the designated pressure value $P_c$ due to the switching to the pressure control, if the designated pressure value $P_c$ is reset to a low value in order to reduce the force for pushing the piston rod 32 of the cylinder 20, an undershoot occurs due to the pressure control to reduce the pump delivery pressure. When the pump delivery pressure decreases to the reference value $(P_c - \alpha)$ or less by the undershoot, the control mode is switched to the flow rate control. Thus, the pump delivery pressure abnormally rises due to the flow rate control and an overshoot occurs. The control mode is again switched to the pressure control by the overshoot, so that an undershoot is caused. The repetition of such overshoot and undershoot causes an abnormal operation of the hunting of the pump delivery pressure.

Consequently, it is extremely difficult to adjust the predetermined value $\alpha$ for switching from the flow rate control to the pressure control to the optimum value and there is a problem such that the reliability of the apparatus cannot be perfectly guaranteed.

SUMMARY OF THE INVENTION

It is an object of the invention to provide a control apparatus of a variable delivery pump in which in the switching from the flow rate control to the pressure control which is performed at the stop of a load, the stop pressure can be held to a stable set pressure for a short time without causing an overshoot of the stop pressure.

Another object of the invention is to provide a control apparatus of a variable delivery pump in which the optimum control characteristic for a desired pressure control can be automatically obtained without needing any special adjustment after the apparatus was assembled.

Still another object of the invention is to provide a control apparatus of a variable delivery pump with high reliability and stability which can perform the optimum switching operation between the flow rate control and the pressure control on the basis of the designated values and measured values of the flow rate and pressure without needing to set and adjust the constants for switching from the flow control to the pressure control.

That is, the present invention relates to a control apparatus of a variable delivery pump in which the flow rate control is performed to control a pump delivery amount so as to keep the designated flow rate value until the stop of a control load, and then the control mode is switched to the pressure control to control the pump delivery amount so as to keep the delivery pressure which rises at the stop of the control load to the designated pressure value.

For such a control apparatus, a remaining delivery volume $(V_r)$ which is necessary until the present delivery pressure P reaches the designated pressure value $P_c$ and an excess delivery volume $(V_e)$ which will be discharged due to the operation time lag of the pump when it is assumed that the delivery is stopped at the present time are first respectively predicted and calculated at every predetermined period from the increasing speed of the delivery pressure when the control load stops. When the remaining delivery volume $(V_r)$ and excess delivery volume $(V_e)$ obtained by the predictive calculations coincide, the stop of the delivery of the pump or the control to set the pump delivery amount to a fixed delivery amount based on a stop leakage flow rate QL is instructed.

Therefore, even if the operation time lag of the pump is caused due to the stop of the delivery, the excess delivery volume $(V_e)$ which will be discharged due to the operation time lag is coincident with or almost equal to the remaining delivery volume $(V_r)$ which is necessary for making the pump delivery pressure reach the designated pressure value $P_c$. Therefore, even if the delivery pressure P has reached the designated pressure value $P_c$, no overshoot occurs. By switching to the pressure control at this stage, the stop pressure can be soon held to the designated pressure value.

Until the delivery stop is performed by the prediction control, the delivery pressure P rapidly increases by the flow rate control. The period of time to shift the control mode to the pressure control to keep the stop accuracy is fairly short, so that the high control response speed can be realized.

On the other hand, according to the invention, the load volume (V) of the pump or the product $(V\beta)$ of the load volume (V) and the fluid compressibility $(\beta)$ is calculated from the increasing speed of the delivery pressure P at the stop of the control load and the delivery pressure P at this time. The feedback gain of the pressure control is controlled on the basis of the calculated value $(V\beta)$.

That is, when the delivery pressure starts increasing due to the stop of the control load, the load volume (V) of the pump or the product $(V\beta)$ of the load volume (V) and the fluid compressibility $(\beta)$ is calculated from the increasing speed of the delivery pressure, for example, a pressure change amount $\Delta P$ per unit time and the delivery flow rate $Q_c$ at this time.

A damping factor $\xi$ showing the control characteristic of the pressure control is a function of a feedback gain A of the pressure control, a time constant $T_p$ of the pump, and the calculated value $(V\beta)$.

Therefore, by predetermining the value of the damping factor $\xi$ in accordance with a desired control characteristic, the feedback gain A is automatically calculated by the calculated value $(V\beta)$. The optimum pressure control according to the predetermined damping factor $\xi$ can be performed by the pressure control due to the feedback gain.

Therefore, even if the volume on the load side differs depending on the apparatus, the pressure control can be performed by automatically setting the optimum feedback gain every apparatus. The desired optimum control characteristic can be derived without performing any complicated adjustment.

Further, according to the invention, the difference $\Delta P$ between the designated pressure value $P_c$ and the measured delivery pressure value P is compared with the designated flow rate value $Q_c$. The smaller one of these values is always set to the designated value of the flow rate control, thereby switching controlling the delivery flow rate or delivery pressure of the pump.

That is to say, in any of the flow rate control and pressure control, the smallest one of the designated flow rate value $Q_c$ which is set from the outside, the difference $\Delta P = (P_c - P)$ between the measured delivery pressure value P detected by the pressure sensor and the designated pressure value $P_c$ which is set from the outside, and the signal $E_p$ which is obtained by amplifying the difference $\Delta P$ is always selected and set to the designated value of the flow rate control, thereby performing the switching between the flow rate control and the pressure control.

In other words, there is formed a minor loop to always make operative the flow rate control loop of the variable delivery pump. Either smaller one of the designated flow rate value $Q_c$ and the signal $E_p$ based on the pressure difference $\Delta P$ is selected as the designated value for the minor loop.

Thus, in the ordinary flow rate control, since the value $E_p$ based on the pressure difference $\Delta P$ is sufficiently large, the smaller designated flow rate value $Q_c$ is selected as the designated value, thereby performing the flow rate control to keep the delivery flow rate Q to the designated flow rate value $Q_c$.

On the other hand, when the cylinder stops, the value $E_p$ based on the pressure difference $\Delta P$ decreases due to the increase in pump delivery pressure P. When $E_p < Q_c$, the smaller value $E_p$ is selected as the designated value of the flow rate control. Thus, the control mode is switched to the mode of the delivery amount to make the measured delivery pressure value P coincide with the selected designated value $E_p$, namely, to the pressure control mode.

Even if the delivery pressure P changes due to the resistance of the pipes or the like during the flow rate control in which the designated flow rate value $Q_c$ was selected, the value $E_p$ based on the pressure difference $\Delta P$ is sufficiently larger than the designated flow rate value $Q_c$, so that $E_p$ is not selected even by the fluctuation in the pressure. A malfunction such that the control mode is switched to the pressure control during the flow rate control does not occur.

Further, in the state in which the control mode is switched to the pressure control by the selection of the designated value $E_p$ and the pressure is set to the stable designated pressure value $P_c$, even if the designated pressure value $P_c$ is reset to a low value, the value $E_p$ further decreases due to the reduction of the designated pressure value $P_c$ by the change of the set value. Thus, even if an undershoot occurs because of the decrease in pump delivery pressure according to the reduction of the designated pressure value $P_c$, this undershoot acts so as to further reduce the $E_p$ and a situation such that the control mode is switched to the flow rate control due to the occurrence of the undershoot does not occur. It is possible to certainly prevent an abnormal operation such as hunting of the pump delivery pressure.

The above and other objects, features, and advantages of the present invention will become more apparent from the following detailed description in conjunction with the accompanying drawings.

DETAILED DESCRIPTION OF THE PREFERRED EMBODIMENTS

Figure 3:
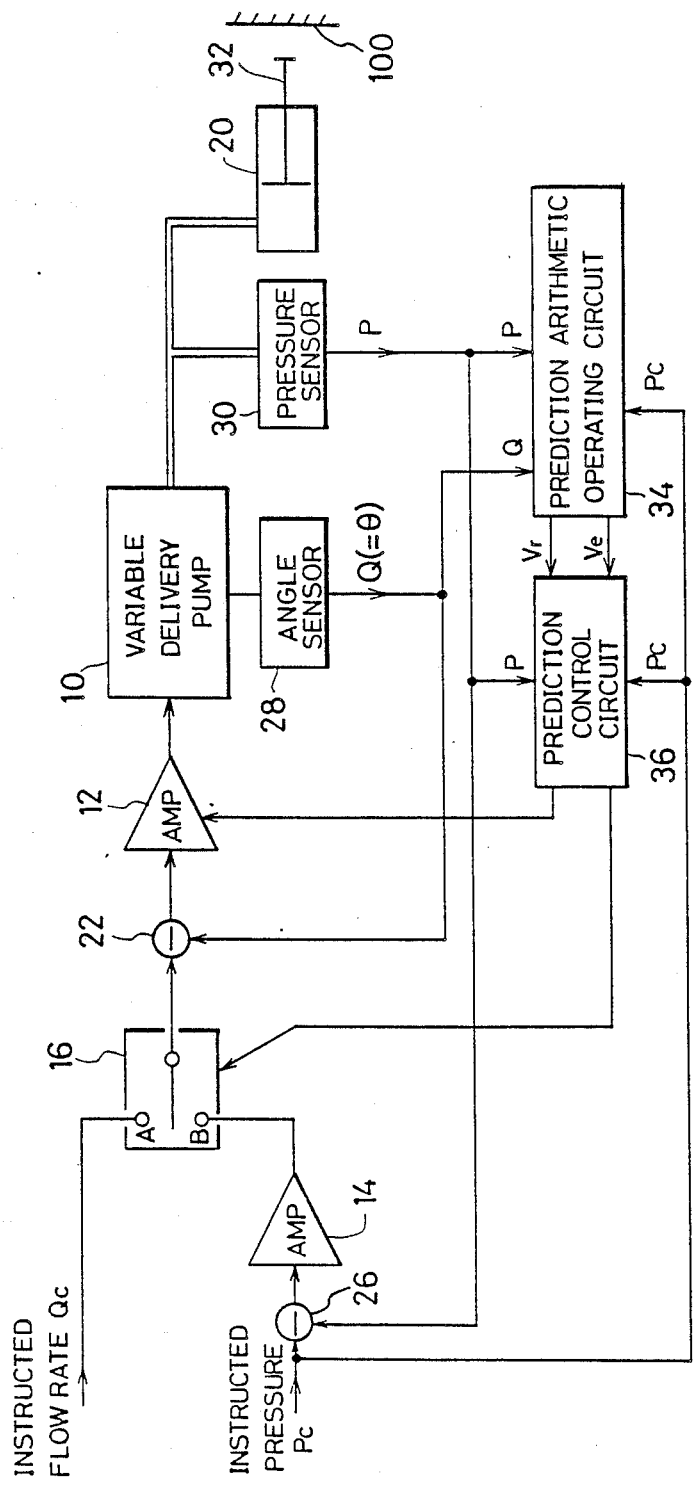
FIG. 3 is a block diagram showing the first embodiment of the invention.

FIG. 3 is a block diagram showing the first embodiment of the present invention.

In FIG. 3, the variable delivery pump 10 has a well-known structure in which a delivery flow rate is changed by varying an angle of inclination of a slant plate. Namely, the pump 10 can change the piston stroke by changing an angle $\theta$ of inclination of the slant plate in accordance with the voltage input or current input, thereby enabling a delivery flow rate to be varied.

A flow rate difference signal $\Delta Q$ from the adding point 22 is input to the servo amplifier 12 for flow rate control. The designated flow rate value $Q_c$ as a set flow rate which is given from a flow rate setting device (not shown) in the state in which the switch 16 is connected to the A side and the inclination angle $\theta$ of the slant plate of the pump 10 which is detected by the angle sensor 28 are input to the adding point 22. The detection angle $\theta$ of the slant plate attached in the pump 10 which is detected by the angle sensor 28 represents the pump delivery flow rate Q. Therefore, the difference signal $\Delta Q$ ($=Q_c-Q$) between the designated flow rate value $Q_c$ and the pump delivery amount Q is output from the adding point 22. Thus, in response to the output of the servo amplifier 12, the delivery amount of the pump 10 is controlled so as to keep the delivery flow rate Q to the designated flow rate $Q_c$, that is, the feedback control of the inclination angle $\theta$ of the slant plate is executed.

As will be clarified in the description hereinlater, the servo amplifier 12 can forcibly control the servo output for the delivery amount control by an external signal.

The pressure difference signal $\Delta P$ from the adding point 26 is input to the servo amplifier 14 for pressure control. The designated pressure value $P_c$ from a pressure setting device (not shown) and the pump delivery pressure P detected by the pressure sensor 30 are input to the adding point 26. A pressure difference signal $\Delta P = P_c - P$ between them is output from the adding point 26. The output of the srevo amplifier 14 is given to the pump 10 through the adding point 22 and servo amplifier 12 when the switch 16 is switched to the B side. Therefore, the feedback control, i.e., the pressure control of the slant plate is performed so as to obtain the pump delivery amount such that the delivery pressure P of the pump 10 is held to the designated pressure value $P_c$.

At the switching timing from the present flow control to the pressure control when the piston rod 32 of the cylinder 20 has touched the object 100 and stopped due to the flow rate control, a prediction arithmetic operating circuit 34 performs the prediction arithmetic operation to optimize the delivery amount of the pump 10 so as to obtain the stop pressure which is determined by the designated pressure value $P_c$ without causing the overshoot.

That is, when the piston rod 32 of the cylinder 20 touches the object 100 and stops, the prediction arithmetic operating circuit 34 starts to sample the delivery flow rate Q and delivery pressure P of the pump 10 every predetermined sampling period of time $T_s$. On the basis of the result of the sampling, for the increasing speed of the delivery pressure at the stop of the cylinder 20, the remaining delivery volume $V_r$ which is necessary for the time interval from the present time point (each sampling time point) until the delivery pressure P reaches the set stop pressure $P_c$ is predicted and calculated.

At the same time, the prediction arithmetic operating circuit 34 predicts and calculates an excess delivery volume $V_e$ which will be discharged due to the operation time lag of the pump when it is assumed that the delivery by the pump 10 was stopped.

The remaining delivery volume $V_r$ and excess delivery volume $V_e$ calculated by the operating circuit 34 are supplied to a prediction control circuit 36. The prediction control circuit 36 compares the volumes $V_r$ and $V_e$ which were prediction calculated by the prediction arithmetic operating circuit 34 every sampling period $T_s$. When the remaining delivery volume $V_r$ is equal to or larger than the excess delivery volume $V_e$, the delivery stop is instructed to the servo amplifier 12. On the other hand, in place of instructing the delivery stop to the servo amplifier 12, an output of a fixed delivery amount QL corresponding to the leakage flow rate at the stop position of the cylinder 20 can be also instructed.

In the actual situation, even if the delivery stop is instructed to the servo amplifier 12, since a small amount of oil leakage ordinarily exists on the load side, it is desirable to instruct the output of the fixed delivery amount corresponding to the latter leakage flow rate.

Further, after the prediction control circuit 36 instructed the delivery stop or discharge of the fixed delivery amount QL to the servo amplifier 12, the switch 16 is switched from the A side to the B side, thereby switching the control mode to the pressure control by the output of the servo amplifier 14. The switching to the pressure control is performed when the delivery pressure P of the pump 10 coincides with the designated pressure value $P_c$ or after the elapse of a predetermined time $T_w$ from the coincidence of the delivery pressure P with the designated pressure value $P_c$.

The principle of the control of the variable delivery pump 10 by the prediction arithmetic operating circuit 34 and prediction control circuit 36 shown in FIG. 3 will now be described together with the operation with reference to FIG. 4.

Figure 4:
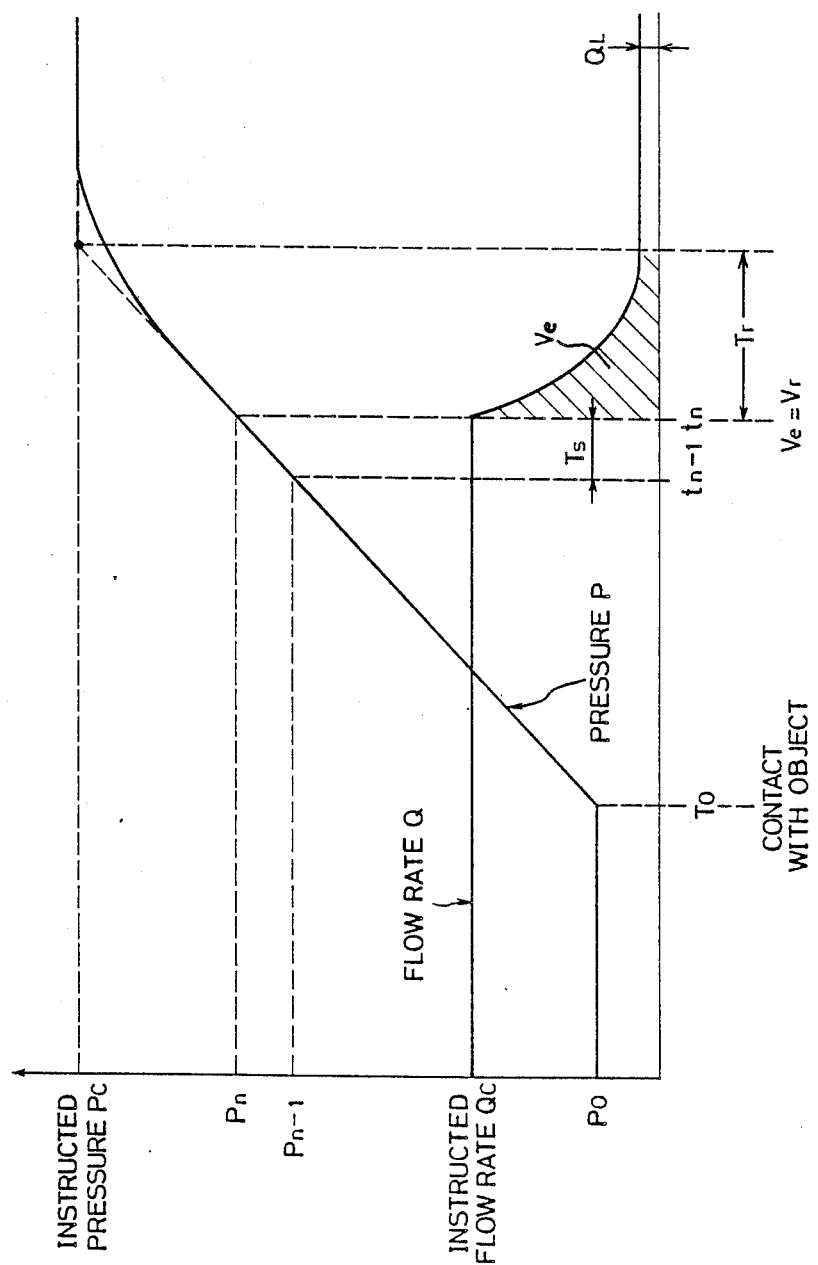
FIG. 4 is an explanatory diagram showing the control operation in FIG. 3.

FIG. 4 shows changes in delivery pressure P and flow rate Q when the cylinder 20 touches the object 100 and stops by the reception of the delivery amount of fluid due to the flow rate control of the variable delivery pump 10 on the basis of the designated flow rate value $Q_c$.

That is, it is now assumed that the piston rod 32 of the cylinder 20 touches the object 100 and stops at time $t_0$ and the motion of the piston of the cylinder 20 is blocked. At this time, since the pump 10 discharges the fluid of the flow rate Q which coincides with the designated flow rate value $Q_c$ by the flow rate control, the internal pressure of the cylinder 20, i.e., the pump delivery pressure increases from the time $t_0$ when the cylinder 20 stops.

At the stop of the cylinder, the delivery pressure P increases in accordance with the following equation.

$$P = 1/V\beta \int_0^t Q\,dt + P_0$$

where, V denotes the load volume and $\beta$ is the operating fluid compressibility. Assuming that the delivery flow rate Q is constant, the pump delivery pressure becomes $$P = (Q/V\beta)t + P_0$$

and rectilinearly increases as shown in FIG. 4.

Therefore, in the prediction arithmetic operating circuit 34 in FIG. 3, the sampling of the delivery flow rate Q and delivery pressure P is started every predetermined sampling period $T_s$ from time $t_0$ when the cylinder 20 stops.

Now, assuming that the delivery pressure at the present time (a certain sampling time point) is $P_n$ and the delivery pressure before the sampling period $T_s$ is $P_{n-1}$, they can be expressed by the following equations, respectively.

$$P_n = (Q/V\beta)t + P_0$$

$$P_{n-1} = (Q/V\beta)(t - T_s) + P_0$$

Therefore, in order to obtain $(Q/V\beta)$ which gives the increasing speed at which the delivery pressure increases from $P_{n-1}$ to $P_n$, i.e., the gradient, the difference between the delivery pressures $P_n$ and $P_{n-1}$ is calculated, so that the gradient, namely, the pressure increasing speed is determined by the following equation.

$$P_n - P_{n-1} = (Q/V\beta)/T_s$$

$$Q/V\beta = (P_n - P_{n-1})/T_s$$

Thus, the remaining time $t_r$ from the present time point $t_n$ until the delivery pressure reaches the designated pressure value $P_c$ as the set stop pressure can be calculated as follows.

$$(P_n - P_c)/t_r = (P_n - P_{n-1})/T_s$$

$$t_r = \{(P_c - P_n)/(P_n - P_{n-1})\}T_s$$

Consequently, the volume of the fluid which will be discharged by the pump 10 for the remaining time $t_r$ from the present time $t_n$, that is, the remaining delivery volume $V_r$ can be prediction calculated by $$V_r = Q \cdot t_r$$

On the other hand, even when the delivery amount is reduced to the fixed delivery amount based on the leakage flow rate at the stop of the delivery or at the stop of the cylinder by changing the inclination angle of the slant plate by instructing the delivery stop to the pump 10 after the elapse of time $t_r$ when the delivery pressure P reaches the designated pressure value $P_c$ from the present time $t_n$, the pump 10 cannot immediately stop the delivery or reduce the delivery amount to a predetermined amount because of the operation time lag of the pump itself. The overdelivery occurs. Thus, the stop pressure is increased by only the amount corresponding to the over delivery amount.

Therefore, the prediction arithmetic operating circuit 34 in FIG. 3 prediction calculates the excess delivery volume $V_e$ which will be discharged due to the operation time lag of the pump when it is assumed that the delivery by the pump is stopped at the present time. It is fairly difficult to calculate the excess delivery volume $V_e$ due to the operation time lag of the pump since there is a variation in performance of each pump and the operation time lag differs depending on the operating condition. However, for example, when the delay of the flow rate control of the pump 10 is regarded as a temporary delay, the excess delivery volume $V_e$ can be expressed by the following equation.

$$V_e = Q \cdot T_p (1 - e^{-\frac{t}{T_p}})$$

where,
$Q$: delivery amount just before the delivery stop,
$T_p$: time constant of the pump,
$t$: elapsed time from the instruction of the delivery stop.
If e $$e^{-\frac{t}{T_p}}$$

satisfies the relation of $t > 2T_p$, it can be regarded that e $$e^{-\frac{t}{T_p}} \approx 0.$$

Therefore, $$V_e \approx Q \cdot T_p$$

Accordingly, the prediction arithmetic operating circuit 34 samples the delivery pressure P to calculate the excess delivery volume $V_r$ and simultaneously measures the delivery flow rate Q, i.e., the inclination angle $\theta$ of the slant plate in the pump, thereby calculating the excess delivery volume $V_e$ when it is assumed that the delivery is stopped at the present time.

The remaining delivery volume $V_r$ and excess delivery volume $V_e$ calculated by the operating circuit 34 every predetermined sampling period are input to the prediction control circuit 36 and compared.

Namely, when the volumes $V_r$ and $V_e$ obtained from the operating circuit 34 are equal, $$V_r = V_e$$

the prediction control circuit 36 instructs the delivery stop to the servo amplifier 12 or the reduction in delivery amount to the fixed delivery amount corresponding to the leakage flow amount in the hydraulic system on the side of the cylinder 20. After the elapse of the fixed time $T_w = 2T_p \sim 3T_p$ which is twice or triple as long as the time constant $T_p$ of the pump 10, or until the delivery pressure substantially coincides with the designated pressure value $P_c$, the control arithmetic operation by the feedback loop is stopped. When the fixed time $T_w$ has elapsed or when $P_c = P$, the switch 16 is switched to the B side, thereby allowing the inherent pressure control to be performed by the servo amplifier 14.

The control by the prediction arithmetic operating circuit 34 and prediction control circuit 36 will now be practically described hereinbelow with reference to FIG. 4.

At time $t_0$ when the piston rod 32 of the cylinder 20 touches the object 100 and stops, the delivery flow rate Q according to the constant designated flow rate value $Q_c$ is obtained by the flow rate control. Therefore, the delivery pressure P rectilinearly increases from time $t_0$. The operating circuit 34 calculates the remaining delivery volume $V_r$ and excess delivery volume $V_e$ every predetermined sampling period and outputs to the prediction control circuit 36. The prediction control circuit 36 monitors to see if the remaining delivery volume $V_r$ is equal to or larger than the excess delivery volume $V_e$ or not. For example, assuming that $V_e = V_r$ at time $t_n$, the prediction control circuit 36 instructs, for instance, to the servo amplifier 12 the reduction of the flow rate to the fixed flow rate Q corresponding to the leakage flow rate amount of the hydraulic system on the side of the cylinder 20 at the stop thereof. Thus, the inclination angle of the pump 10 changes and the delivery flow rate Q decreases to the fixed flow rate QL. The increasing speed of the delivery pressure P which has been increasing rectilinearly with a decrease in delivery amount Q is also reduced. The remaining delivery volume $V_r$ which is necessary until the delivery pressure reaches the designated pressure value $P_c$ which was predicted at time $t_n$ is equal to the excess delivery volume $V_e$ shown by the hatched region which was simultaneously predicted. Thus, the delivery pressure P reaches the designated pressure value $P_c$ without causing an overshoot. After the elapse of the fixed time $T_w$ corresponding to the interval between $2T_p$ to $3T_p$ from time $t_n$, or when the delivery pressure P substantially coincides with the designated pressure value $P_c$, the switch 16 is switched to the B side, thereby switching the control mode to the pressure control by the servo amplifier 14. Consequently, even if the control mode is switched from the flow rate control to the pressure control, no overshoot occurs and no switching shock occurs. Or, even if the switching shock occurs, it is so small as to be ignored.

Figure 5:
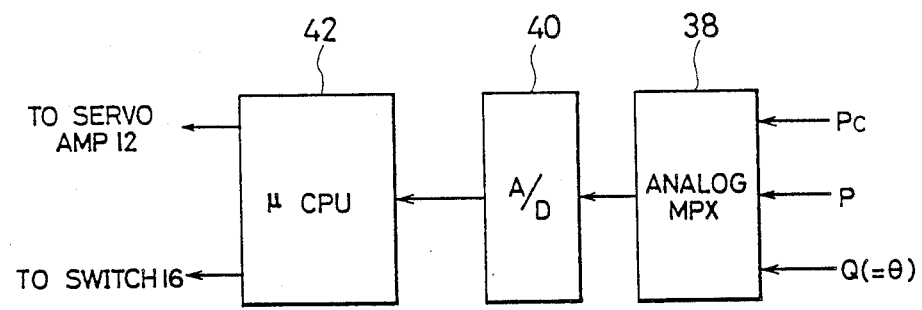
FIG. 5 is a block diagram showing a practical embodiment of a prediction arithmetic operating circuit and a prediction control circuit in FIG. 3.

FIG. 5 is a block diagram showing a practical embodiment of the prediction arithmetic operating circuit 34 and prediction control circuit 36 in the embodiment of FIG. 3.

In FIG. 5, an analog multiplexer 38, an A/D converter 40, and a microprocessor 42 are provided.

Namely, the analog multiplexer 38 sequentially receives the designated pressure value $P_c$, delivery pressure P, and delivery flow rate Q (inclination angle $\theta$ of the slant plate) every predetermined period. The A/D converter 40 converts an output of the analog multiplexer 38 into a digital signal. Further, the microprocessor 42 calculates the remaining delivery volume $V_r$ and excess delivery volume $V_e$ and outputs control signals based on the comparison between the volumes $V_r$ and $V_e$ calculated to the servo amplifier 12 and switch 16.

Figure 6:
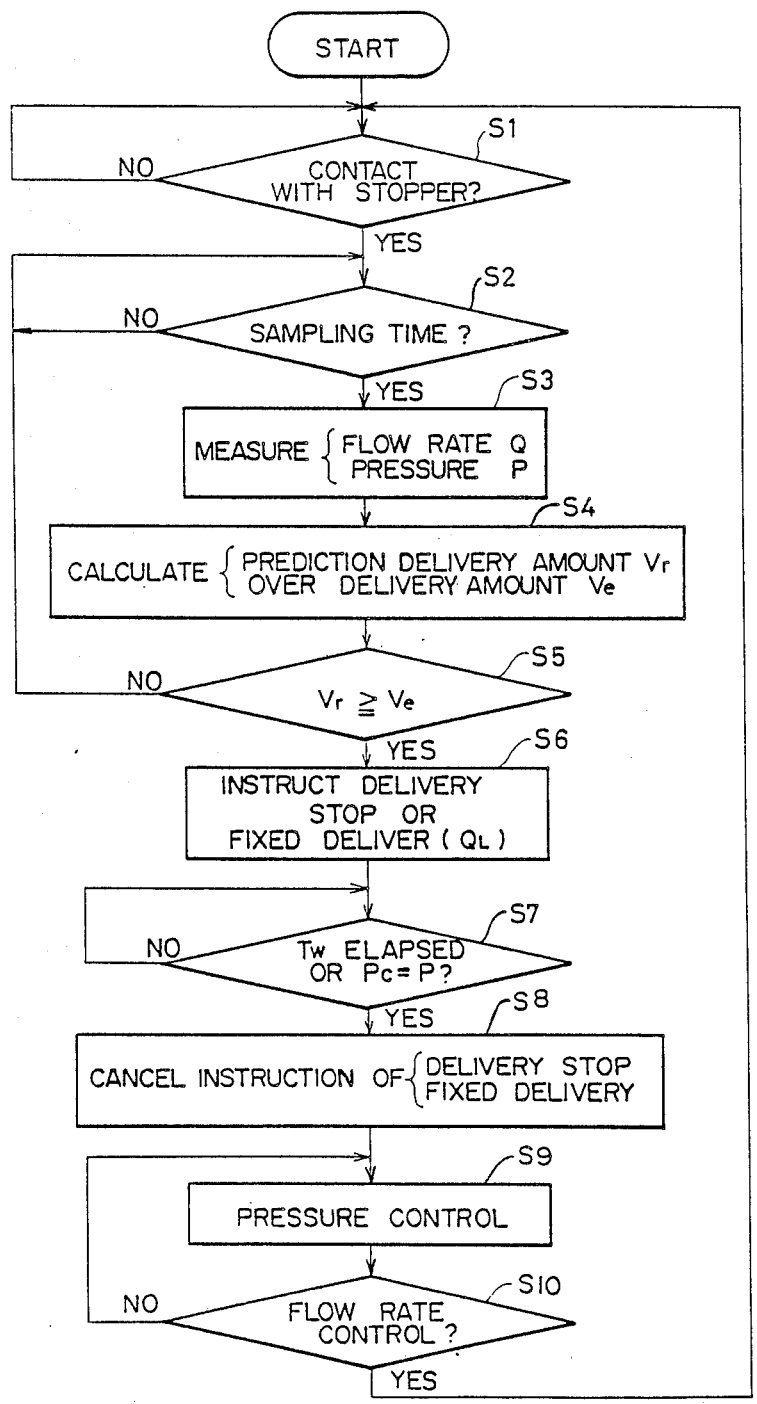
FIG. 6 is a flowchart showing control processes according to an embodiment of FIG. 5.

The control by the microprocessor 42 shown in FIG. 5 is shown in a flowchart of FIG. 6.

In FIG. 6, a check is first made in step S1 to see if the piston rod 32 of the cylinder 20 has touched the object 100 and stopped or not. When the piston rod 32 touches the object 100 and the cylinder 20 stops, a check is then made in step S2 to see if the sampling time has come or not. If the sampling time has come, step S3 follows and the flow rate Q and pressure P at that time are measured. In the next step S4, the remaining delivery volume $V_r$ and excess delivery volume $V_e$ are calculated. The volumes $V_r$ and $V_e$ calculated are compared in step S5. When $V_r$ is equal to or larger than $V_e$ in step S5, step S6 follows and the delivery stop or the reduction to the fixed delivery amount QL is instructed to the servo amplifier 12. In the next step S7, a check is made to see if the fixed time $T_w$ has elapsed or the delivery pressure P coincides with the designated pressure value $P_c$ or not.

If the condition in step S7 is satisfied, the delivery stop instruction or fixed delivery instruction is cancelled in step S8. The switch 16 is switched to the B side in step S9, thereby switching the control mode to the pressure control by the servo amplifier 14.

The volumes $V_r$ and $V_e$ can be also always calculated and compared without discriminating the stop of the cylinder in step S1.

An explanation will now be made with respect to another embodiment to calculate the excess delivery volume $V_e$ of the pump 10 which is calculated by the prediction arithmetic operating circuit 34 in FIG. 3.

Namely, as mentioned above, it is predicted that the calculating accuracy of the excess delivery volume $V_e$ of the pump 10 is low. However, in the case of the same pump structure, that is, the same type of pump, a variation in pump is small and the pump almost similarly operates. For example, the excess delivery volume $V_e$ can be expressed by the function of the flow rate Q just before the delivery stop is instructed.

$$V_e = f(Q \approx \theta)$$

That is, the excess delivery volume $V_e$ can be almost unconditionally determined by the flow rate Q or inclination angle $\theta$ of the slant plate just before the stop of the pump.

Therefore, if the initial value Q or inclination angle $\theta$ of the slant plate just before the pump stops has already been known, the excess delivery volume $V_e$ can be unconditionally determined. Accordingly, in place of the calculation of the excess delivery volume $V_e$ on the basis of the temporary time lag as mentioned above, the initial value Q is set to a variable, the excess delivery volume $V_e$ at that time is experimentally obtained, thereby making table data in which the experimental values of $V_e$ are written by using the initial value Q as an address. This table data is written into, e.g., the memory of the microprocessor 42 shown in FIG. 5. The excess delivery volume $V_e$ corresponding to the delivery flow rate Q (the flow rate at time $t_n$ in FIG. 4) just before the pump stops is read out. Due to this, the high accurate control can be performed.

On the other hand, in the calculation of the remaining delivery volume $V_r$ by the arithmetic operating circuit 34 in FIG. 3, only the pressure $P_n$ at the present time and the pressure $P_{n-1}$ before one period are used, thereby predicting the remaining time $T_r$ until the delivery pressure reaches the designated pressure value $P_c$. Therefore, the arithmetic operating accuracy of the excess delivery volume $V_r$ can be further improved by the weighted means or the like of a plurality of values using $P_{n-1}$ before one period and $P_{n-2}$ before two periods, $P_{n-2}$ before two periods and $P_{n-3}$ before three periods, and the like.

Further, as shown in FIG. 4, it is presumed that the delivery flow rate Q is constant ($Q = Q_c$) by the flow rate control at a timing near time $t_0$ when the piston rod 32 of the cylinder 20 touches the object 100 and stops. However, by increasing the flow rate Q at a timing near time $t_0$, the response speed until the delivery pressure reaches the designated pressure value $P_c$ can be further improved.

Practically speaking, when the flow rate Q is made constant, although the excess delivery volume $V_e$ has been set such that $$V_e = f(\theta),$$

it is set to the function of two parameters of $$V_e = f\{\theta \cdot (d\theta/dt)\}$$

and $$d\theta/dt = Q_n - Q_{n-1}$$

In this way, a table memory to obtain the excess delivery volume $V_e$ is made. By reading the excess delivery volume $V_e$ in the table memory by the initial value Q and $(Q_n - Q_{n-1})$, the increasing speed at which the delivery pressure reaches the stop pressure which is determined by the designated pressure value $P_c$ is made high. The control response speed can be made high.

In this manner, according to the first embodiment of FIG. 3, the remaining delivery volume which is necessary until the delivery pressure at the present time reaches the set stop pressure and the excess delivery volume which will be delivered by the operation time lag of the pump when it is assumed that the delivery is stopped at the present time are respectively prediction calculated from the increasing speed of the pressure at the stop of the load. When both of the remaining delivery volume and the excess delivery volume coincide, in order to stop the delivery or to reduce the delivery amount to the fixed delivery amount based on the stop leakage flow rate, the delivery pressure can be controlled to the set stop pressure without causing the overshoot. The extremely good control characteristic can be derived.

On the other hand, in the conventional apparatus, in order to prevent the occurrence of the overshoot, the complicated adjustments such as to reduce the feedback gain of the pressure control and the like must be performed after the system was manufactured. However, according to the first embodiment, there is no need to adjust the feedback gain of the pressure control and the like and the adjustments after the system was manufactured can be simplified.

In addition, the conventional apparatus cannot be applied to a precision apparatus such that the overshoot must not occur. However, according to the first embodiment, the high accurate control can be performed without using another hydraulic pressure control valve or the like to absorb the overshoot.

Moreover, in the first embodiment, there is a case where not only it is requested that no overshoot occurs but also the control characteristic such that the overshoot is actively generated is required. In order to avoid the overshoot, the operating mode is switched so as to stop the delivery when the remaining delivery volume and the excess delivery volume coincide. However, when there is the relation of $V_r < V_e$ such that the remaining delivery volume $V_r$ is smaller than the excess delivery volume $V_e$ by a predetermined amount, by switching the operating mode, the required control characteristic with the overshoot can be easily realized.

Figure 7:
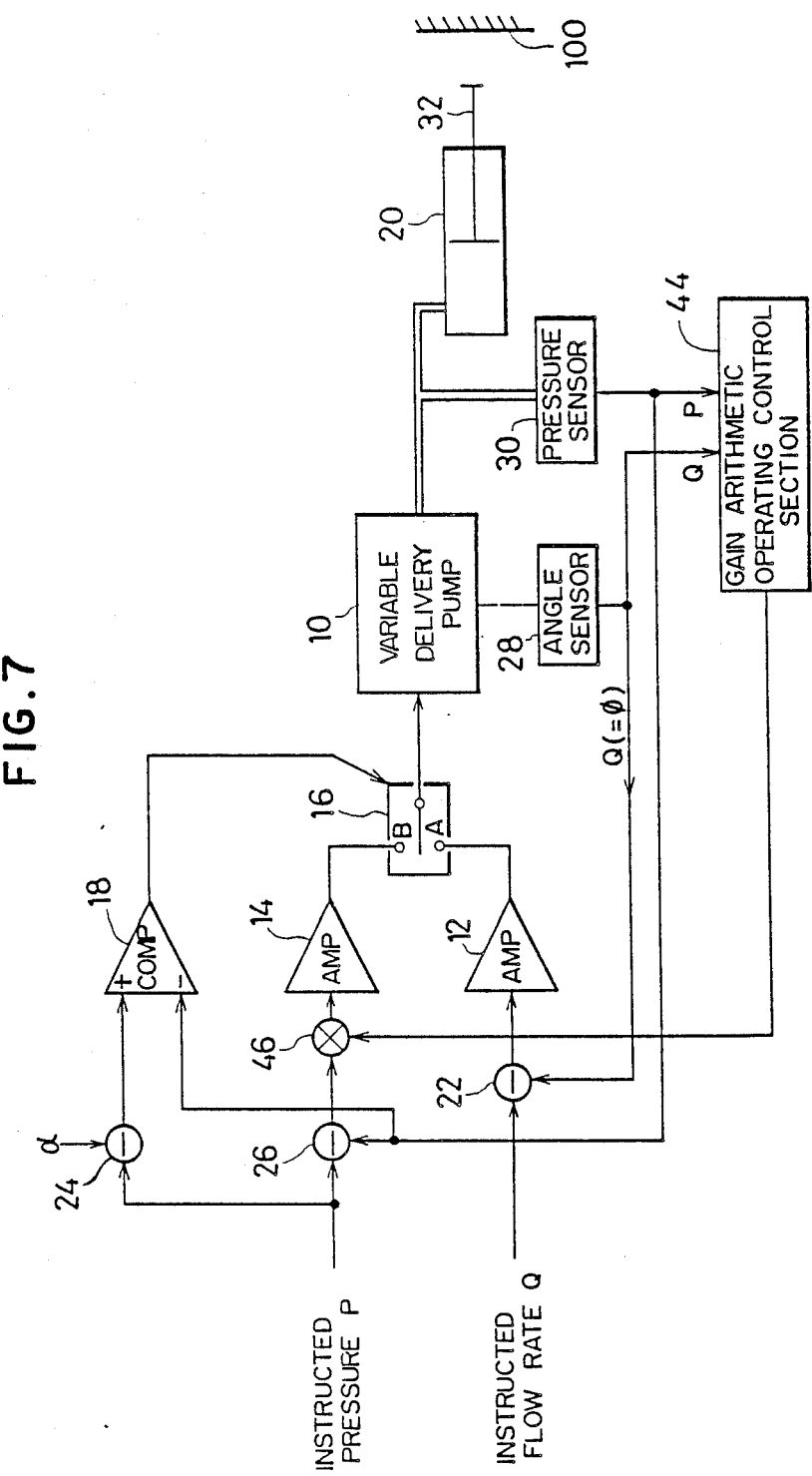
FIG. 7 is a block diagram showing the second embodiment of the invention.

FIG. 7 is a block diagram showing the second embodiment of the invention.

In FIG. 7, the variable delivery pump 10 can change the inclination angle of the slant plate in accordance with the input voltage or input current. When the inclination angle of the slant plate changes, the piston stroke varies, so that the delivery flow rate Q can be changed. The inclination angle of the slant plate is detected by the angle sensor 28 and the detection angle $\theta$ represents the delivery flow rate Q of the pump.

The flow rate control system and pressure control system are provided for the pump 10.

First, the flow rate control system has the servo amplifier 12 and adding point 22. The designated flow rate value $Q_c$ from a flow rate setting device (not shown) and the detection angle $\theta$ of the angle sensor 28, i.e., the delivery flow rate Q of the pump are input to the adding point 22. The signal indicative of the difference between $Q_c$ and Q is input to the servo amplifier 12. In the flow rate control mode, the switch 16 is switched to the A side. The delivery flow rate Q of the pump 10 is controlled so as to be equalized to the designated flow rate value $Q_c$ in a feedback manner by the output of the servo amplifier 12. On the other hand, the pressure control system has the servo amplifier 14 and adding point 26. The designated pressure value $P_c$ from a pressure setting device (not shown), i.e., the set stop pressure after the piston rod 32 of the cylinder 20 touched the object 100 and stopped is input to the adding point 26. The delivery pressure P of the pump 10 which is detected by the pressure sensor 30 is also input to the adding point 26. Therefore, the difference signal indicative of the difference between $P_c$ and P is output from the adding point 26 to the servo amplifier 14. In the pressure control mode, the switch 16 is connected to the B side. Thus, the delivery pressure P of the pump 10 is controlled so as to be equal to the designated pressure value $P_c$ in a feedback manner by the output of the servo amplifier 14.

The outputs of the servo amplifiers 12 and 14 are switched by the switch 16 in accordance with the control mode of the flow control or pressure control. The switching operation of the switch 16 is controlled by the output of the voltage comparator 18. The delivery pressure P of the pump 10 detected by the pressure sensor 30 and the reference signal from the adding point 24 are input to the voltage comparator 18. The designated pressure value $P_c$ and a predetermined value $\alpha$ are input to the adding point 24. The differential value of $(P_c - \alpha)$ which is slightly smaller than the designated pressure value $P_c$ is input as a reference value to the voltage comparator 18. Thus, in the ordinary flow rate control, since the delivery pressure P is smaller than the reference value $(P_c - \alpha)$ from the adding point 24, for example, the voltage comparator 18 outputs a high level signal and the switch 16 is switched to the A side. The output of the servo amplifier 12 is input to the pump 10. In this manner, the flow rate control is executed.

When the cylinder 20 touches the cylinder end or the piston rod 32 touches the object 100 and stops due to the flow rate control, the delivery pressure P starts increasing. When the increasing delivery pressure P reaches the reference value $(P_c - \alpha)$ from the adding point 24 or more, the output level of the voltage comparator 18 is inverted to the low level, so that the switch 16 is switched to the B side and the output of the servo amplifier 14 is input to the pump 10. The control mode is switched to the pressure control mode.

Figure 1:
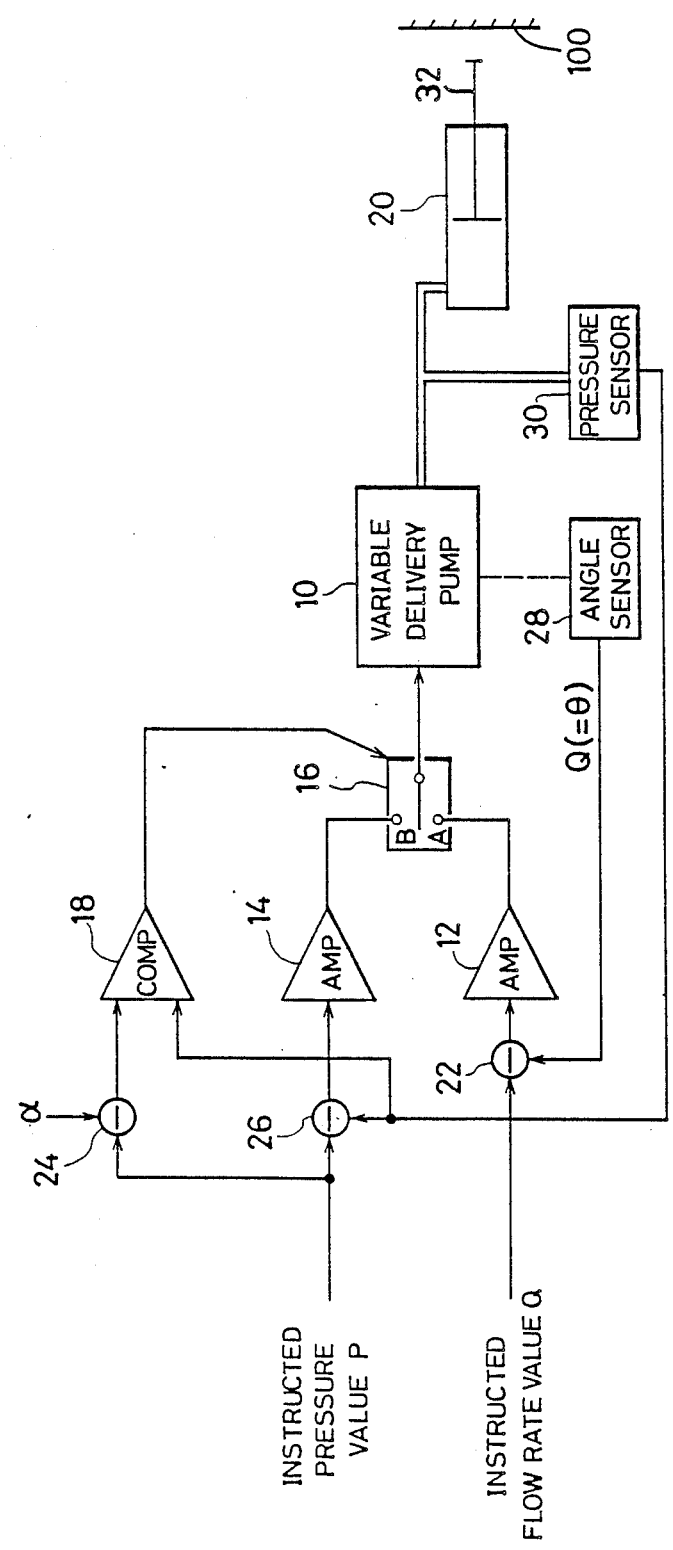
FIG. 1 is a block diagram showing a conventional control apparatus.
Figure 2:
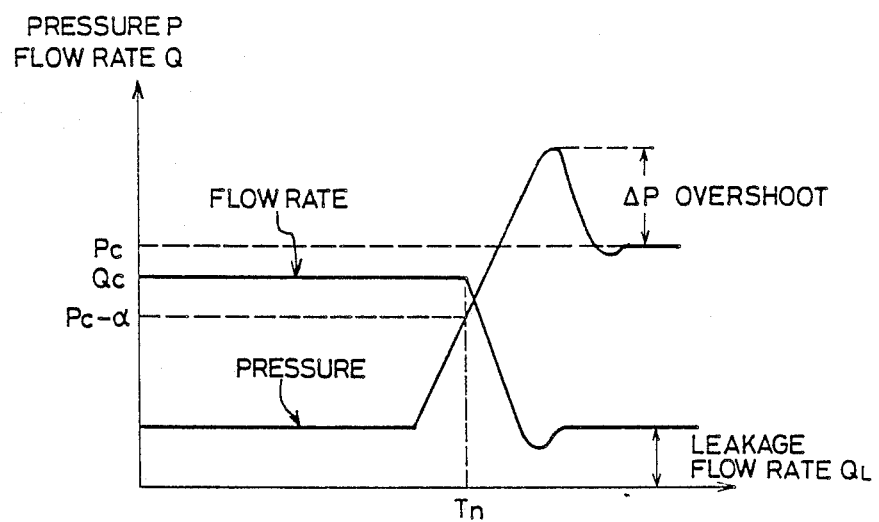
FIG. 2 is an explanatory diagram showing the conventional control operation.

Such a constitution is the same as that of the conventional apparatus shown in FIG. 1. In addition to this constitution, in the second embodiment of the invention, a multiplier 46 is provided for the input of the servo amplifier 14 for pressure control. The difference signal from the adding point 26 and a multiplier signal from a gain arithmetic operating control section 44, which will be explained hereinafter, are input to the multiplier 46. The signal which is obtained by multiplying the multiplier from the gain control section 44 to the difference signal is output to the servo amplifier 14.

For instance, a multiplug-in D/A converter can be used as the multiplier 46. That is, the difference signal (analog voltage signal) from the adding point 26 is input to a reference voltage input terminal of the multiplug-in D/A converter. The multiplier (digital data) from the gain control section 44 is input to a digital input terminal of this D/A converter. Thus, the analog signal in which the input signal to the reference voltage input terminal is multiplied with the multiplier to the digital input terminal can be obtained to the D/A conversion output terminal.

By providing the multiplier 46 to multiply the difference signal from the adding point 26 for the input of the servo amplifier 14, the function similar to that the servo amplifier 14 is constituted as a variable gain amplifier can be derived. The feedback gain in the pressure control can be varied by the multiplier from the gain control section 44.

The gain control section 44 calculates the load volume V of the pump or the product $(V\beta)$ of the load volume V and fluid compressibility $\beta$ from the increasing speed of the delivery pressure P when the cylinder 20 as the control load touches the cylinder end or the piston rod 32 touches the object 100 and stops. The feedback gain of the pressure control is controlled on the basis of the calculated value V or $(V\beta)$ so as to obtain the predetermined control characteristic.

The control principle of the feedback gain in the pressure control by the gain arithmetic operating control section 44 will now be described.

Figure 8:
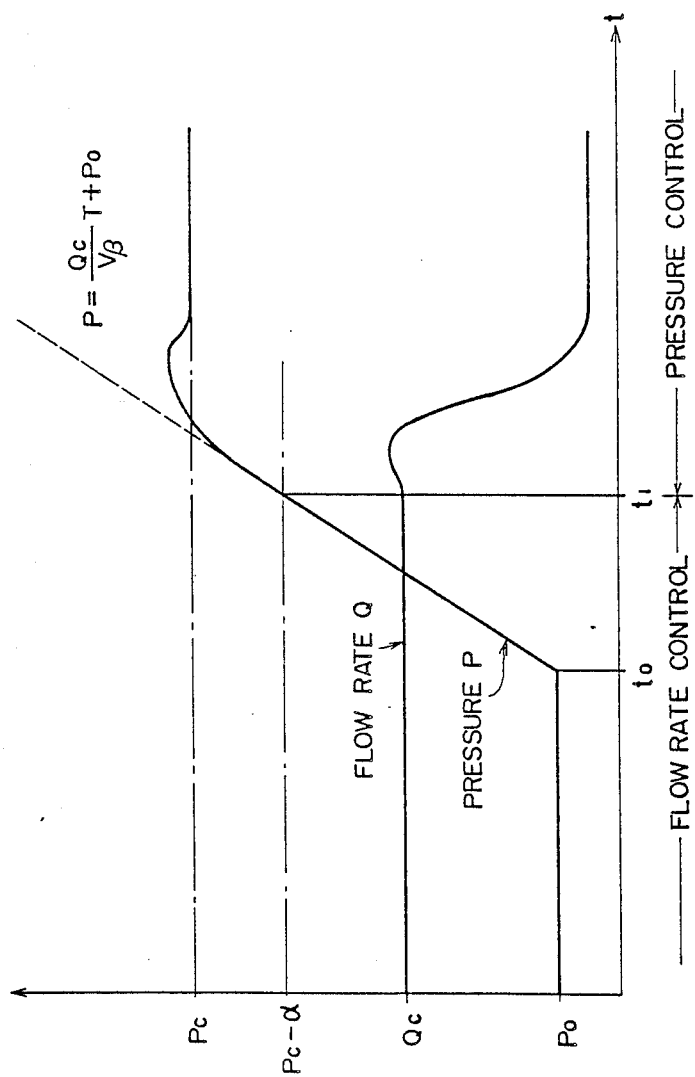
FIG. 8 is an explanatory diagram showing time-dependent changes in delivery pressure and delivery flow rate when the control mode is switched from the flow rate control to the pressure control in the embodiment of FIG. 7.

FIG. 8 is a diagram for explaining the state in which the delivery pressure P increases since the piston rod 32 of the cylinder 20 as the control load touches the object 100 and stops due to the flow rate control based on the designated flow rate value $Q_c$.

That is, the fluid of the flow rate Q which coincides with the designated flow rate value $Q_c$ is discharged from the pump 10 by the flow rate control. The piston rod 32 of the cylinder 20 starts moving to the right from the left end and the piston rod 32 touches the object 100, so that the piston rod cannot move any more. Therefore, the compression of the operating fluid discharged from the pump is started in the cylinder 20, so that the delivery pressure P of the pump suddenly starts increasing from time $t_0$ when the piston rod 32 touched the object 100.

At this time, the pressure increases as follows.

$$P = (1/V\beta) \int_{t_0}^{t} Q_c dt + P_0$$

where,

V: load volume,

β: compressibility of the operating fluid, $P_0$: delivery pressure at time $t_0$.

Since the delivery flow rate $Q_c$ is constant, $$P = (Q_c/V\beta)t + P_0$$

The delivery pressure P of the pump rectilinearly increases.

Therefore, the gain control section 44 measures the delivery pressure P every predetermined sampling period $T_s$. For example, assuming that the present delivery pressure sampled in the pressure increasing state after time $t_0$ is set to $P_n$ and the delivery pressure before the sampling period $T_s$ is set to $P_{n-1}$, $P_n$ and $P_{n-1}$ are given by the following equations.

$$P_n = (Q_c/V\beta)t + P_0$$

$$P_{n-1} = (Q_c/V\beta)(t - T_s) + P_0$$

By calculating the difference between $P_n$ and $P_{n-1}$, $$P_n - P_{n-1} = (Q_c/V\beta)T_s$$

Therefore, the product (Vβ) of the load volume V and operating fluid compressibility β can be calculated by $$V\beta = (P_n - P_{n-1})T_s/Q_c$$

In other words, the increasing speed (change amount per unit time) of the delivery pressure when the cylinder stops is obtained from the delivery pressure $P_n$ at the present time and the delivery pressure $P_{n-1}$ before one period (before the sampling period $T_s$). The product (Vβ) of the load volume V and operating fluid compressibility β can be calculated on the basis of the delivery flow rate $Q_c$.

A stable coefficient, i.e., the damping factor ξ of the pressure control system can be substantially expressed by ti $\xi = 1/(2\approx\overline{A \cdot K \cdot T_p/V_{62}})$ where A: amplification factor of the servo amplifier 14, K: another gain, $T_p$: time constant of the pump.

From this equation, it will be understood that as the value of (Vβ) is small, the damping factor ξ decreases. On the contrary, as the vague of (Vβ) is large, the dumping factor ξ increases.

It is generally known that the damping factor ξ is equal to 1, the settling time is the shortest and the non-oscillating response is derived. On the other hand, if a slight oscillation is permitted, it is sufficient to set such that ξ<1. On the contrary, to avoid the oscillation, by setting such that ξ>1, the optimum control can be performed.

When the gain control section 44 calculates (Vβ) from the pressure increasing curve when the cylinder 20 stops, the amplification factor A of the servo amplifier 14 is calculated so that the damping factor ξ is set to the predetermined optimum value.

Namely, the amplification factor A for the servo amplifier 14 is obtained by $$A = (V\beta)/(4 \cdot \xi^2 \cdot K \cdot T_p)$$

The output of the voltage comparator 18 is monitored. When switching from the flow rate control to the pressure control, the multiplier (digital data) corresponding to the amplification factor A of the servo amplifier 14 is output to the multiplier 46. By keeping a constant multiplier output while the apparatus is in the pressure control state, the optimum feedback gain of the pressure control can be always automatically determined.

Figure 9:
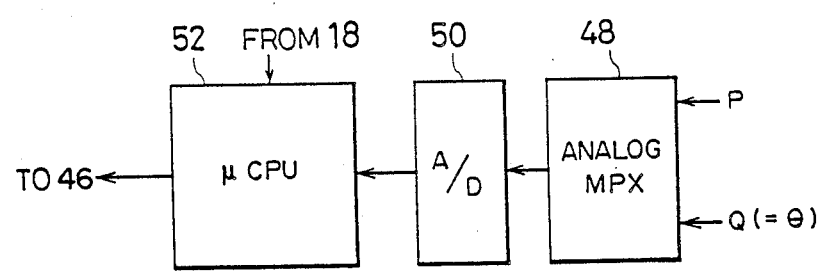
FIG. 9 is a block diagram showing a practical embodiment of a gain arithmetic operating control section in FIG. 7.

FIG. 9 shows a practical embodiment of the gain control section 44 shown in FIG. 7.

The gain arithmetic operating control section shown in FIG. 9 comprises: an analog multiplexer 48; an A/D converter 50; and a microprocessor 52. The delivery pressure P of the pump 10 and the inclination angle θ of the slant plate, i.e., the delivery flow rate Q are input to the analog multiplexer 48. The delivery pressure P and delivery flow rate Q are successively input to the analog multiplexer 48 every predetermined sampling period $T_s$. An output of the analog multiplexer 48 is converted into a digital signal by the A/D converter 50 and input to the microprocessor 52.

The comparison output of the voltage comparator 18 shown in FIG. 7 is input to the microprocessor 52. By monitoring the comparison output, the control mode can be switched from the flow rate control to the pressure control or from the pressure control to the flow rate control. The value of the damping factor ξ to decide the response characteristic of the pressure control is preset in the microprocessor 52 in accordance with the request of the control load. For example, when the response characteristic such that the settling time is short and no oscillation occurs is required, the damping factor ξ is preset to 1.

Figure 10:
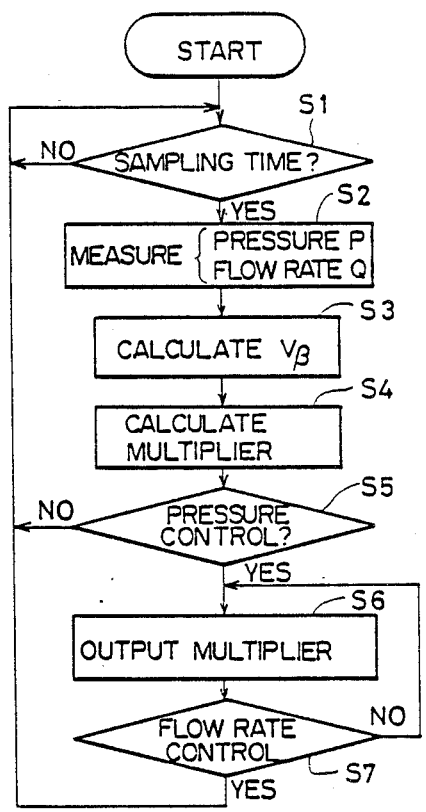
FIG. 10 is a flowchart showing the optimum pressure control according to the embodiment of FIG. 9.

FIG. 10 is a flowchart showing the gain control arithmetic operating processes by the microprocessor 52 shown in FIG. 9.

In FIG. 10, it is now assumed that the flow rate of the pump 10 is controlled on the basis of the designated flow rate value $Q_c$ and the movement of the piston rod 32 of the cylinder 20 from the left end to the right is started. At this time, a check is made in step S1 to see if a predetermined sampling time has come or not. If YES, step S2 follows and the delivery pressure P and delivery flow rate Q at that time are measured. In the next step S3, the product (Vβ) of the load volume V and fluid compressibility β is calculated. In step S4, the multiplier to obtain the amplification factor A of the servo amplifier 14 which gives the preset damping factor ξ of 1 is calculated on the basis of the calculated value (Vβ).

In step S5, a check is made to see if the pressure control mode has been set or not. In the case of the flow control mode, the processes in steps S1 to S5 are repeated.

When the piston rod 32 of the cylinder 20 touches the object 100 and stops, the delivery pressure P suddenly increases. When the delivery pressure P becomes ($P_c\alpha$) which was set as the reference value by the adding point 24 or more, the output of the voltage comparator 18 is inverted into the L level, thereby switching the switch 16 from A side to B side. Therefore, it is determined in step S5 that the pressure control mode has been set, and step S6 follows. In step S6, the multiplier calculated in step S4 is output to the multiplier 46. Thus, the feedback gain of the pressure control is set to the value based on the multiplier output from the gain control section 44. The pressure control by the preset damping factor ξ=1 is performed. That is, the response characteristic of the pressure control such that the pump delivery pressure P is promptly settled to the designated pressure value $P_c$ and no oscillation occurs is derived. The delivery pressure for the stopped cylinder 20 is held to the designated pressure value $P_c$.

In the next step S7, a check is made to see if the flow rate control mode has been set or not. If NO in step S7, the output of the multiplier in step S6 is continued. When the control mode is switched to the flow rate control, the processing routine is returned to step S1.

In the embodiment, the pressure $P_n$ at the present time and the pressure $P_{n-1}$ before one period have been used to calculate the product $(V\beta)$ of the load volume and fluid compressibility. However, it is also possible to obtain the mean value of a plurality of products $(V\beta)$ which are calculated by using the pressure $P_{n-1}$ before one period and the pressure $P_{n-2}$ before two periods, and the pressure $P_{n-3}$ before three periods, and the like. The accuracy of the calculated value of $(V\beta)$ can be further improved by such an averaging process.

In the foregoing embodiment, the product $(V\beta)$ of the load volume and fluid compressibility has been calculated from the increasing speed of the delivery pressure and the delivery flow rate. However, it is also possible to control the feedback gain in a manner similar to the above by setting the fluid compressibility $\beta$ to a constant and by calculating only the load volume V.

According to the second embodiment of the invention as mentioned above, the load volume V of the pump or the product $(V\beta)$ of the load volume and fluid compressibility has been calculated from the increasing speed of the delivery pressure when the control load stops and from the delivery flow rate at that time, and the feedback gain of the pressure control is controlled on the basis of the calculated value $(V\beta)$. Therefore, for apparatuses using the fluid in a wide range in which the volumes on the load side differ, there is no need to adjust the feedback gain in the pressure control loop to the variable delivery pump every apparatus, so that the number of adjusting steps and the adjustment cost can be reduced.

In addition, the abnormal control and the like due to the defective adjustment do not occur. The response characteristic of the pressure control corresponding to a predetermined dumping factor can be automatically obtained. Thus, the control performance and reliability can be improved.

Figure 11:
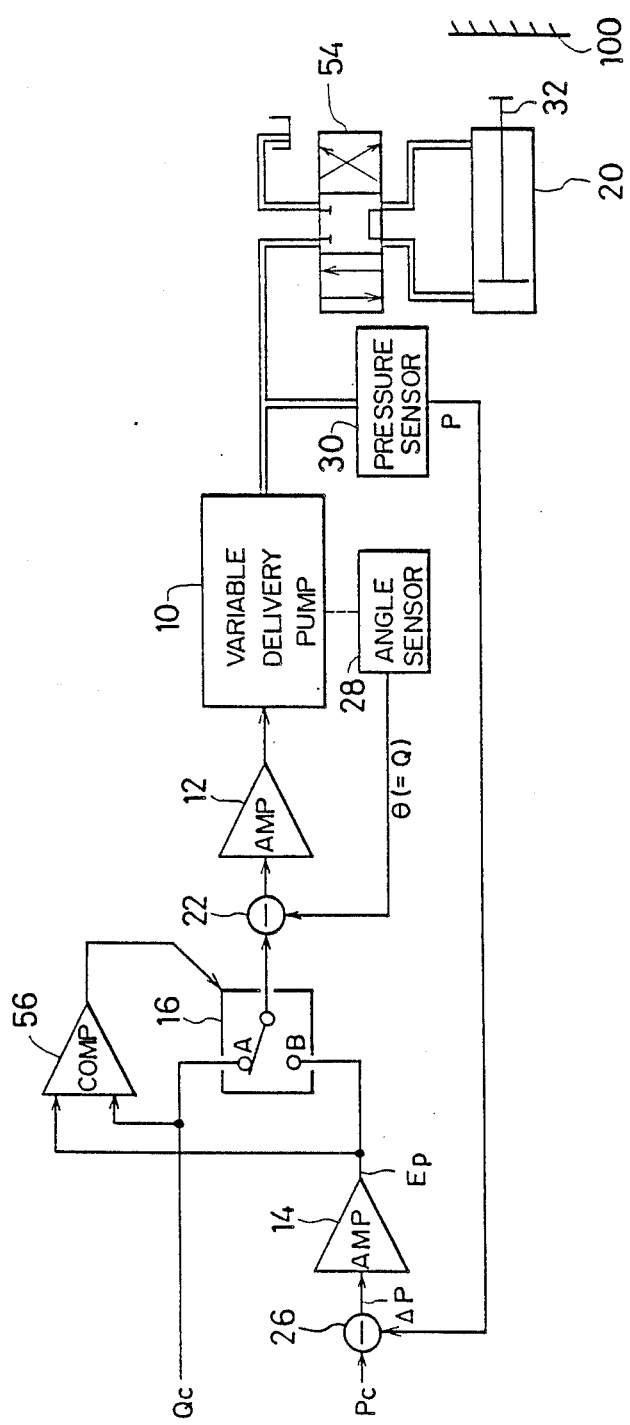
FIG. 11 is a block diagram showing the third embodiment of the invention.

FIG. 11 is a block diagram showing the third embodiment of the invention.

In FIG. 11, the variable delivery pump 10 has a slant plate driving mechanism as a mechanism which can vary the delivery amount. The pump 10 can vary the inclination angle of the slant plate in accordance with an input voltage or input current, so that the piston stroke changes and the delivery amount of the pump can be varied. Further, the angle sensor 28 to detect the inclination angle $\theta$ of the slant plate is attached to the slant plate driving mechanism of the pump 10. The detection angle $\theta$ by the angle sensor 28 is used as the pump delivery flow rate Q for flow rate control.

The flow rate control system for the pump 10 comprises the servo amplifier 12 and adding point 22. The designated flow rate value $Q_c$ from a flow rate setting device (not shown) and the delivery flow rate Q corresponding to the detection angle $\theta$ of the slant plate from the angle sensor 28 are input to the adding point 22. The difference between them is output from the adding point 22 and supplied to the servo amplifier 12. Therefore, the pump 10 is controlled in a feedback manner so that the delivery flow rate Q coincides with the designated flow rate value $Q_c$.

On the other hand, the pressure control system comprises the servo amplifier 14 and adding point 26. The designated pressure value $P_c$ from a pressure setting device (not shown) and the delivery pressure P of the pump 10 detected by the pressure sensor 30 are input to the adding point 26. The difference $\Delta P = P_c - P$ between them is output from the adding point 26 and supplied to the servo amplifier 14. Assuming that the amplification factor of the servo amplifier 14 is set to A, the servo amplifier 14 outputs the signal $E_p$ of $$E_p = A(P_c - P) = A \cdot \Delta P$$

However, the output signal $E_p$ of the servo amplifier 14 for pressure control is not directly input to the pump 10 but input to the B side of the switch 16. Therefore, only when the switch 16 is connected to the B side, the output signal $E_p$ from the servo amplifier 14 is given as the designated pressure value to the adding point 22 of the flow rate control system.

The designated flow rate value $Q_c$ from a flow rate setting device (not shown) is given to the A side of the switch 16. Thus, the switch 16 selects either one of the designated flow rate value $Q_c$ on the A side and the output signal $E_p$ of the servo amplifier 14 as the designated value of the flow rate control system.

For example, a semiconductor analog switch is used as the switch 16 to select the designated value of the flow rate control system. The switching operation of the switch 16 is controlled by a comparison output of a voltage comparator 56. The designated flow rate value $Q_c$ from a flow rate setting device (not shown) and the output signal $E_p$ of the servo amplifier 14 are input to the voltage comparator 56. The switch 16 is switched so as to select either smaller one of the signal $E_p$ and the designated flow rate value $Q_c$. That is, when the value $Q_c$ is smaller than the value of the signal $E_p$, the switch 16 is switched to the A side as shown in FIG. 11 by the output of the voltage comparator 56. On the contrary, the value of the signal $E_p$ is smaller than the designated flow rate value $Q_c$, the switch 16 is switched to the B side.

The delivery fluid of the pump 10 is supplied to the cylinder 20 as the control load through a direction change-over valve 54. When the piston of the cylinder 20 is located at the left end as shown in the diagram, if the direction change-over valve 54 is switched to the switching position on the left side, the piston moves to the right. After the piston rod 32 touched the object 100 and stopped, if it is returned to the original position, the direction change-over valve 54 is switched to the switching position on the right side.

The operation of the embodiment of FIG. 11 will now be described with reference to FIGS. 12A, 12B, and 12C.

First, as shown in FIG. 11, it is assumed that the direction change-over valve 54 is switched to the position on the left side in the state in which the piston of the cylinder 20 is located at the left end, and the piston is moved to the right.

In this case, since the delivery fluid from the pump 10 is not influenced by the volume of the cylinder 20, the delivery pressure P has a low value due to the resistance of the pipes and cylinder 20. Therefore, the signal $E_p = A \cdot \Delta P$ which is obtained by multiplying the pressure difference $\Delta P = P_c - P$ derived from the adding point 26 with A by the servo amplifier 14 is sufficiently larger than the designated flow rate value $Q_c$ as shown in FIG. 12B. Thus, the switch 16 is switched to the A side by the comparison output of the voltage comparator 56. The smaller designated flow rate value $Q_c$ is selected and input to the adding point 22 as the designated value for the flow rate control system. Accordingly, the pump 10 drives the slant plate so that the inclination angle $\theta$ of the slant plate detected by the angle sensor 28, i.e., the delivery flow rate Q coincides with the designated flow rate value $Q_c$ selected, thereby performing the flow rate control to control the pump delivery amount. Therefore, the piston rod 32 of the cylinder 20 moves to the right at a constant speed.

Assuming that the piston rod 32 touched the object 100 at time $t_1$ by the driving of the cylinder 20 due to the flow rate control, the delivery pressure P suddenly increases because the volume of the cylinder 20 does not change. In response to the increase in the delivery pressure P, the signal $E_p$ based on the pressure difference $\Delta P$ which is output from the servo amplifier 14 rectilinearly decreases. When the decreasing signal $E_p$ is equal to or less than the designated flow rate value $Q_c$ at time $t_1$, the comparison output of the voltage comparator 56 is inverted, so that the switch 16 is switched to the B side. By the switching of the switch 16 to the B side, the signal $E_p$ which is smaller than the designated flow rate value $Q_c$ is selected as the designated value of the flow rate control system and input to the adding point 22 of the flow rate control system. Therefore, the flow rate control system reduces the inclination angle of the slant plate so that the delivery flow rate Q coincides with the designated value $E_p$ selected by the switch 16, thereby reducing the delivery amount of the pump. Due to the flow rate control, the signal $E_p$ which is output from the servo amplifier 14 also decreases. When the delivery pressure P coincides with the designated pressure value $P_c$, the output signal $E_p$ of the servo amplifier 14 based on the pressure difference is held to zero or a predetermined value based on the stop leakage flow rate, thereby performing the flow rate control to keep the delivery pressure P to the designated pressure value $P_c$.

Figure 12:
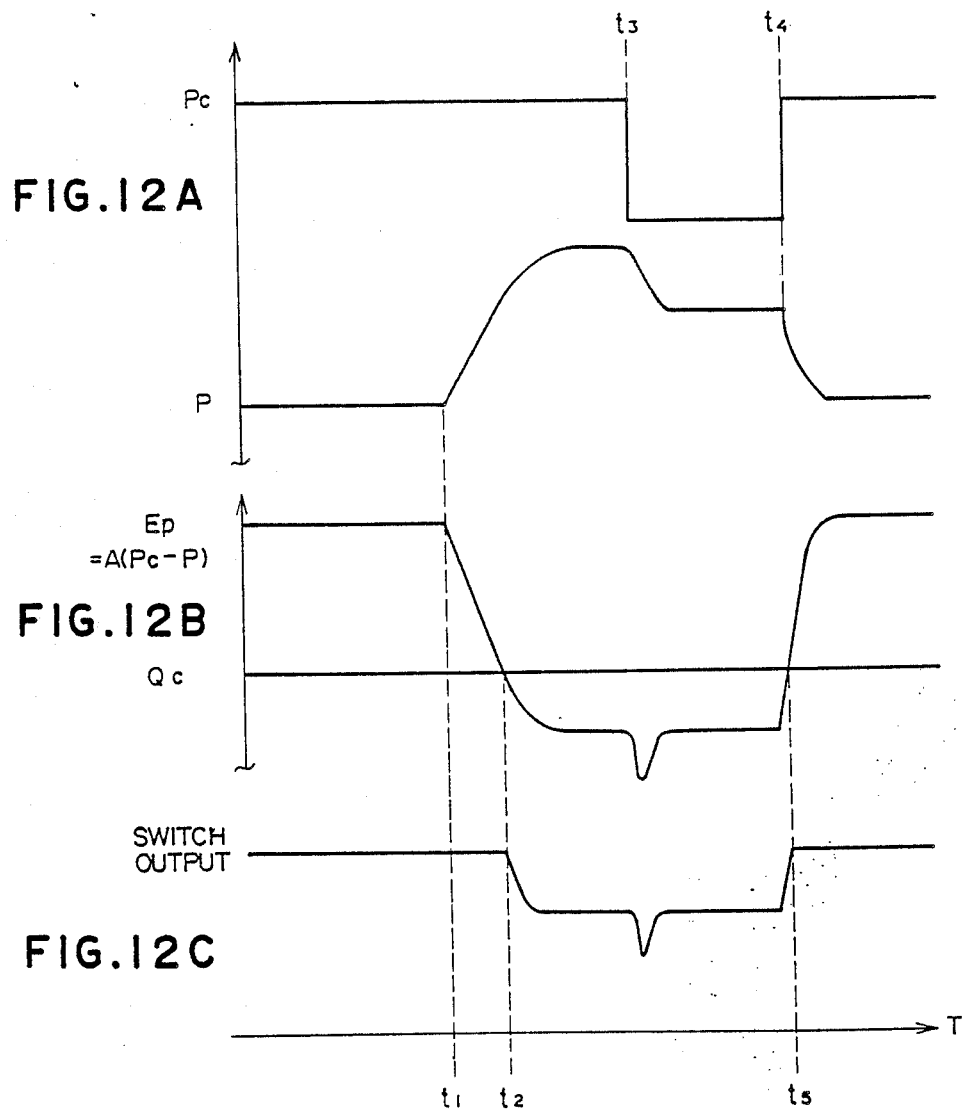
FIG. 12A is an explanatory diagram showing time-dependent changes in designated pressure value and delivery pressure P according to the control of FIG. 11.
FIG. 12B is an explanatory diagram showing time-dependent changes in designated flow rate value $Q_c$ and signal $E_p$ according to the control of FIG. 11.
FIG. 12C is an explanatory diagram showing a time-dependent change in output signal of a switching circuit according to the control of FIG. 11.

It is now assumed that in the state in which the delivery pressure P is settled to the designated pressure value $P_c$ by the flow rate control in which the output signal $E_p$ from the servo amplifier 14, in order to reduce the pressing force to the object 100 by the piston rod 32 of the cylinder 20 as shown at time $t_3$ in FIG. 12A, the designated pressure value $P_c$ is reduced by the operation of a pressure setting device (not shown). By reducing the designated pressure value $P_c$ in this manner, the output signal $E_p$ of the servo amplifier 14 further decreases and the delivery pressure P can be decreased.

On the contrary, assuming that the designated pressure value $P_c$ is increased, if the output signal $E_p$ from the servo amplifier 14 exceeds the designated flow rate value $Q_c$, the designated flow rate value $Q_c$ is selected by the switch 16, so that the delivery amount of the pump 10 is increased, thereby raising the delivery pressure P.

Further, when the control mode is switched to the flow rate control to return the piston rod 32 to the original position in the state in which the piston rod 32 of the cylinder 20 touched the object 100 and stopped, it is sufficient to switch the direction change-over valve 54 to the position on the right side.

When the valve 54 is switched to the right position, the delivery pressure P decreases as shown at time $t_4$ and the output signal $E_p$ from the servo amplifier 14 exceeds the designated flow rate value $Q_c$ at the timing of time $t_5$ and the switch 16 is switched to the A side to select the designated flow rate value $Q_c$. Thus, the flow rate control is again executed.

Figure 13:
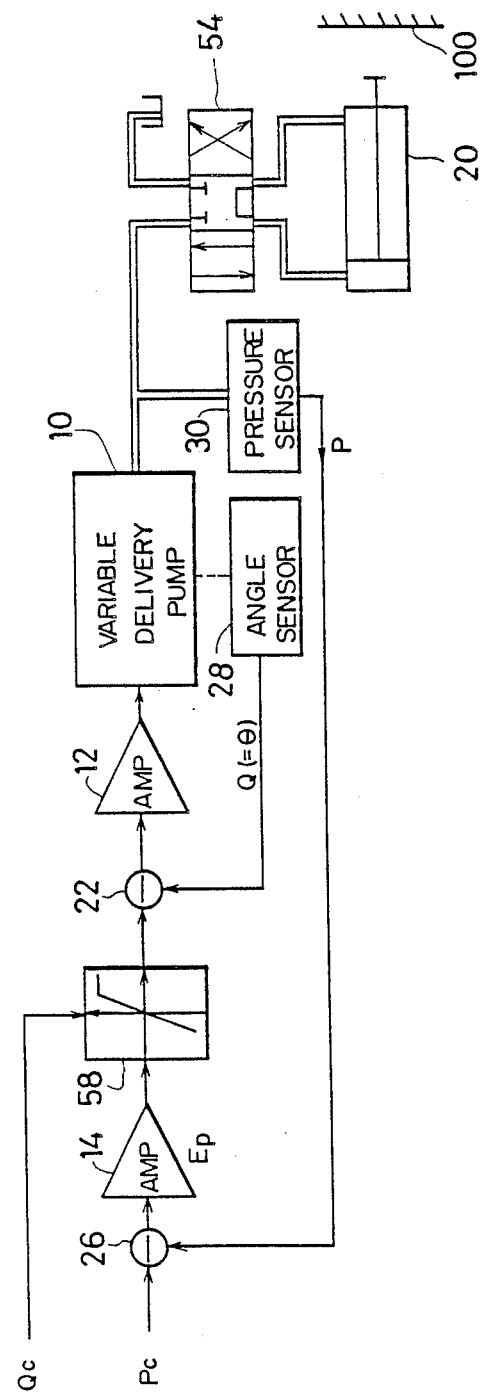
FIG. 13 is a block diagram showing another embodiment to perform the same control as FIG. 11.

FIG. 13 is a block diagram showing a modification of the third embodiment of the invention. In this embodiment, an output voltage upper limit circuit 58 is used in place of the voltage comparator 56 and switch 16 in the embodiment of FIG. 11.

Namely, the output signal $E_p$ from the servo amplifier 14 is input to the limit circuit 58. The upper limit value of the output signal $E_p$ is determined by the designated flow rate value $Q_c$ which is set from the outside. Thus, the limit circuit 58 directly outputs the output signal $E_p$ of the servo amplifier 14 until the signal $E_p$ reaches the designated flow rate value $Q_c$. When the signal $E_p$ exceeds the designated flow rate value $Q_c$, this value $Q_c$ is output by the upper limit setting operation. Thus, the limit circuit 58 has the function to select either smaller one of the signal $E_p$ and the designated flow rate value $Q_c$ as the designated value.

Figure 14:
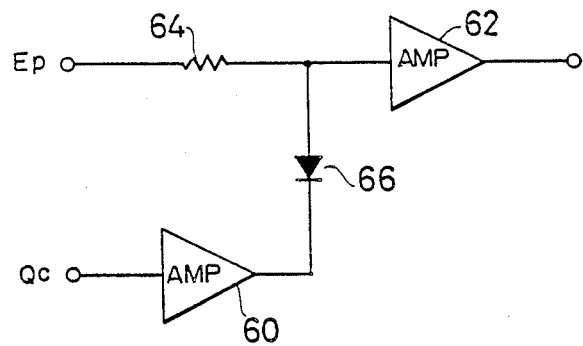
FIG. 14 is a circuit diagram of an output voltage upper limit circuit in FIG. 13.

FIG. 14 is a circuit diagram showing a practical example of the output voltage upper limit circuit 58 in FIG. 13.

In FIG. 14, the designated flow rate value $Q_c$ is amplified by a buffer amplifier 60 having the amplification factor of the gain+1. When the signal $E_p$ which is input through a resistor 64 is equal to or less than the designated flow rate value $Q_c$, a diode 66 is turned off and no current flows. Thus, the same voltage as the input signal $E_p$ is output by a buffer amplifier 62 having the amplification factor of the gain+1 in which the input resistance is extremely high.

On the contrary, when the input signal $E_p$ is larger than the designated flow rate value $Q_c$, the diode 66 is made conductive and a current flows through the resistor 64. Thus, the input voltage of the buffer amplifier 62 is equalized to the designated flow rate value $Q_c$ and the flow rate designated value $Q_c$ is output from the buffer amplifier 62.

The difference which is caused by the voltage drop in the forward direction of the diode 66 can be cancelled by subtracting the offset voltage corresponding to the forward voltage drop of the diode 66 from the buffer amplifier 60.

In the embodiments, the signal $E_p$ which is obtained by amplifying the pressure difference $\Delta P$ by A times by the servo amplifier 14 and the designated flow rate value $Q_c$ which is set from the outside are compared by the voltage comparator 56 or limit circuit 58. However, the pressure difference $\Delta P$ obtained from the adding point 26 and the designated flow rate value $Q_c$ can be also compared.

As described above, according to the third embodiment of the invention, the value based on the difference between the designated pressure value and the measured delivery pressure is compared with the designated flow rate value, and either smaller one of these values is always used as the designated value of the flow rate control system, thereby varying the delivery amount of the pump and controlling the delivery flow rate or delivery pressure. Therefore, there is no need to set the constant to switch the control mode between the pressure control and the flow rate control and it is unnecessary to adjust the switching constant to obtain the optimum control characteristic after the apparatus was assembled. Consequently, the adjustment and inspection after completion of the assembly are simplified. Further, the abnormal operation of the apparatus by the erroneous adjustment does not occur. Thus, the apparatus using the hydraulic pressure of the fluid with extremely high reliability and stability can be realized.

What is claimed is:

1. A control apparatus of a variable delivery pump comprising:
    flow rate detecting means for detecting a delivery flow rate of said variable delivery pump;
    pressure detecting means for detecting a delivery pressure of the pump;
    flow rate control means for controlling a delivery amount of the pump so as to keep a designated flow rate value which is indicated by a flow rate setting device until a control load stops;
    pressure control means for controlling the pump delivery amount such that the delivery pressure which increases when the control load stops is held to a designated pressure value which is indicated from a pressure setting device;
    switching means for switching a control mode to a pressure control when the pump delivery pressure exceeds a predetermined value during a flow rate control and for switching the control mode to the flow rate control when the pump delivery pressure is equal to or lower than said predetermined value during the pressure control; and
    a gain arithmetic operating control section for calculating the product ($V\beta$) of a load volume ($V$) and a fluid compressibility ($\beta$) from an increasing speed of the delivery pressure when the control load stops and from the delivery flow rate at this time, and for controlling a feedback gain of said pressure control means on the basis of the calculated value of said product ($V\beta$).

2. A control apparatus according to claim 1, wherein said gain arithmetic operating control section has:
    sampling means for sampling the pump delivery pressure every predetermined period $T_s$ when the control load stops and the increase in the pump delivery pressure starts; and
    arithmetic operating means for calculating the product ($V\beta$) by the following equation, $$V\beta = (P_n - P_{n-1})T_s/Q_c$$

on the basis of the pump delivery pressure $P_n$ at the present time obtained from said sampling means and the pump delivery pressure $P_{n-1}$ which was sampled before one period.

3. A control apparatus according to claim 1, wherein said gain arithmetic operating control section has means for obtaining a gain A of a servo amplifier provided for said pressure control means by the following equation, $$A = (V\beta)/(4 \cdot \xi^2 \cdot K \cdot T_p)$$

on the basis of the calculated value of said product ($V\beta$), in which
    $\xi$: preset damping factor,
    K: another gain,
    $T_p$: time constant of the pump,
and for controlling so as to obtain the gain A.

* * * * *